US011698330B2

(12) United States Patent
Owens et al.

(10) Patent No.: US 11,698,330 B2
(45) Date of Patent: Jul. 11, 2023

(54) SYSTEMS, DEVICES, AND METHODS FOR RHEOLOGICAL MEASUREMENT OF YIELD STRESS FLUIDS USING FRACTAL-LIKE FIXTURES

(71) Applicant: Massachusetts Institute of Technology, Cambridge, MA (US)

(72) Inventors: Crystal Elaine Owens, River Falls, WI (US); Gareth H. McKinley, Acton, MA (US); Anastasios John Hart, Waban, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 294 days.

(21) Appl. No.: 17/072,025

(22) Filed: Oct. 15, 2020

(65) Prior Publication Data
US 2021/0109003 A1 Apr. 15, 2021

Related U.S. Application Data

(60) Provisional application No. 62/915,331, filed on Oct. 15, 2019.

(51) Int. Cl.
*G01N 11/14* (2006.01)
*G01N 11/00* (2006.01)
*B01L 3/00* (2006.01)

(52) U.S. Cl.
CPC ............ *G01N 11/14* (2013.01); *B01L 3/5085* (2013.01); *G01N 2011/0033* (2013.01)

(58) Field of Classification Search
CPC ...... G01N 11/14; G01N 11/16; G01N 11/162; G01N 11/167; G01N 2011/145; G01N 11/142; G01N 11/165; G01N 2011/0033
See application file for complete search history.

(56) References Cited

U.S. PATENT DOCUMENTS 25,329 A * 9/1859 Haeckel ................ B01F 27/702
366/325.1
1,835,621 A * 12/1931 Webre .................... G01N 11/14
159/44

(Continued)

FOREIGN PATENT DOCUMENTS

AT 515219 A4 * 7/2015 ............. G01N 11/14
CN 106089807 A 11/2016

(Continued)

OTHER PUBLICATIONS

Elizabeth Denne, "Visions in Math—Snowflakes", Dec. 9, 2015. (Year: 2015).*

(Continued)

*Primary Examiner* — David A. Rogers
(74) *Attorney, Agent, or Firm* — Barnes & Thornburg, LLP

(57) ABSTRACT

The present disclosure is directed to rheometric fixtures for making rheological measurements of yield stress fluids. In some embodiments, the fixture can be an improvement of a typical vane by having the ability to create a more homogeneous shear profile in a test material, e.g., a yield stress fluid. These vane fixtures having fractal-like cross-sectional structures enable robust rheological measurements of the properties of yield stress fluids due to several outer contact edges that lead to increased kinematic homogeneity at the point of yielding and beyond. The branching structure of the fractal-like fixtures can alter the shape of a wetted perimeter of the fixture while minimizing an area thereof to allow the fixture to be inserted into fluids with less disturbance. In some embodiments, a cup with a ribbed inner surface can be used to hold the sample fluid and disassembles for ease of cleaning following completion of the measurement.

23 Claims, 7 Drawing Sheets

(56) References Cited

U.S. PATENT DOCUMENTS

| | | | | |
|---|---|---|---|---|
| 2,382,979 | A * | 8/1945 | Demb | G01N 11/14 |
| | | | | 73/54.32 |
| 4,181,023 | A * | 1/1980 | Clamroth | G01N 11/14 |
| | | | | 73/54.23 |
| 4,878,378 | A * | 11/1989 | Harada | G01N 11/14 |
| | | | | 73/54.35 |
| 4,893,496 | A * | 1/1990 | Bau | G01F 1/66 |
| | | | | 73/152.55 |
| 5,357,785 | A * | 10/1994 | Hemmings | B01L 9/00 |
| | | | | 73/54.32 |
| 5,684,247 | A * | 11/1997 | Preikschat | G01N 11/14 |
| | | | | 73/54.32 |
| 5,877,410 | A * | 3/1999 | Duke | G01N 11/14 |
| | | | | 422/68.1 |
| 5,938,333 | A * | 8/1999 | Kearney | B01F 25/00 |
| | | | | 366/DIG. 3 |
| 6,333,019 | B1 * | 12/2001 | Coppens | B01F 35/7182 |
| | | | | 261/DIG. 7 |
| 6,481,267 | B1 | 11/2002 | Iles et al. | |
| 6,782,735 | B2 * | 8/2004 | Walters | G01N 11/14 |
| | | | | 73/54.28 |
| 6,971,262 | B1 * | 12/2005 | Marchal | B01F 31/445 |
| | | | | 73/54.24 |
| 7,021,123 | B2 * | 4/2006 | Wallevik | G01N 11/14 |
| | | | | 73/54.38 |
| 7,201,040 | B2 * | 4/2007 | Bateson | G01N 11/14 |
| | | | | 73/54.38 |
| 7,392,842 | B2 * | 7/2008 | Morgan | G01N 11/14 |
| | | | | 166/250.1 |
| 7,624,625 | B2 * | 12/2009 | Jau | G01N 11/14 |
| | | | | 366/64 |
| 7,712,526 | B2 * | 5/2010 | Morgan | G01N 11/14 |
| | | | | 166/250.1 |
| 7,915,356 | B2 * | 3/2011 | Amelia | B01F 27/2322 |
| | | | | 422/135 |
| 7,926,326 | B2 * | 4/2011 | Franck | G01N 11/14 |
| | | | | 73/54.23 |
| RE42,882 | E * | 11/2011 | Kearney | B01J 19/24 |
| | | | | 138/42 |
| 8,347,693 | B2 * | 1/2013 | Pindiprolu | G01N 11/14 |
| | | | | 73/54.23 |
| 8,485,716 | B2 * | 7/2013 | Handa | B01F 27/192 |
| | | | | 366/270 |
| 8,794,051 | B2 * | 8/2014 | Morgan | G01N 11/14 |
| | | | | 73/54.23 |
| 9,116,092 | B2 * | 8/2015 | Samaniuk | G01N 11/14 |
| 9,138,699 | B2 * | 9/2015 | Kulkarni | B01F 27/96 |
| 9,702,800 | B2 * | 7/2017 | Morgan | G01N 11/14 |
| 2004/0213084 | A1 * | 10/2004 | Kearney | B01J 19/24 |
| | | | | 138/42 |
| 2005/0138991 | A1 * | 6/2005 | Wallevik | B01F 27/711 |
| | | | | 73/54.28 |
| 2007/0297285 | A1 * | 12/2007 | Cross | B01F 25/40 |
| | | | | 366/340 |
| 2008/0060423 | A1 * | 3/2008 | Jau | G01N 11/14 |
| | | | | 73/54.31 |
| 2008/0230220 | A1 * | 9/2008 | Morgan | G01N 11/14 |
| | | | | 166/250.1 |
| 2010/0116033 | A1 * | 5/2010 | Hoenderkamp | G01N 11/10 |
| | | | | 73/54.28 |
| 2014/0033803 | A1 * | 2/2014 | Ozadali | B01F 27/0724 |
| | | | | 73/54.28 |
| 2014/0208834 | A1 * | 7/2014 | Doe | G01N 11/14 |
| | | | | 73/54.28 |

FOREIGN PATENT DOCUMENTS

| | | | | |
|---|---|---|---|---|
| CN | 106958813 | A | 7/2017 | |
| CN | 109939585 | A * | 6/2019 | B01F 7/00033 |
| FR | 3036138 | A1 * | 11/2016 | F02K 1/386 |
| KR | 101450490 | B1 * | 10/2014 | |
| WO | 2017123639 | A1 | 7/2017 | |
| WO | 2018237331 | A1 | 12/2018 | |

OTHER PUBLICATIONS

ESPACENET Machine Translation of ON 106958813 A Which Originally Published On Jul. 18, 2017. (Year: 2017).*
Abou, et al. "Nonlinear Rheology of Laponite Suspensions Under an External Drive". The Society of Rheology. 2003.
Atkinson, et al. "The torque on a rotating n-bladed vane in a Newtonian fluid or linear elastic medium". Proc. R. Soc. A Math. Phys. Eng. Sci. 438, 183-196. 1992.
Bagley, et al. "On the fractional calculus model of viscoelastic behavior". J. Rheol. 30, 133-155. 1986.
Balmforth, et al. "Yielding to stress: recent developments in viscoplastic fluid mechanics". Annu. Rev. Fluid Mech. 46, 121-146. 2013.
Baravian, et al. "Vane rheometry with a large, finite gap". Appl. Rheol. 12, 81-87. 2002.
Barnes, et al. "The vane-in-cup as a novel rheometer geometry for shear thinning and thixotropic materials". J. Rheol. 34, 841-866. 1990.
Barnes, et al. "Rotating vane rheometry—a review". J. Non-Newton. Fluid Mech. 98, 1-14. 2001.
Benmouffok-Benbelkacem, et al. "Non-linear viscoelasticity and temporal behavior of typical yield stress fluids: Carbopol, xanthan and ketchup". Rheol. Acta 49, 305-314. 2010.
Bikos, et al. "Customizable tool geometries by additive manufacturing for mechanical rheometry of soft matter". J. Rheol. 60, 1257-1267. 2016.
Bird, et al. Dynamics of Polymeric Liquids. Wiley. 1987.
Bonn, et al. "Yield stress materials in soft condensed matter". Rev. Mod. Phys. 89, 1-40. 2017.
Bourell, et al. "Materials for additive manufacturing". CIRP Ann.—Manuf. Technol. 66, 659-681. 2017.
Chaparian, et al. "Cloaking: particles in a yield-stress fluid". J. Non-Newton. Fluid Mech. 243, 47-55. 2017.
Chevrel, et al. "The viscosity of pahoehoe lava: in situ syn-eruptive measurements from Kilauea, Hawaii". Earth Planet. Sci. Lett. 493, 161-171. 2018.
Courtial, et al. "Silicone rheological behavior modification for 3D printing: evaluation of yield stress impact on printed object properties". Addit. Manuf. 28, 50-57. 2019.
Coussot. "Yield stress fluid flows: a review of experimental data". J. Non-Newton. Fluid Mech. 211, 31-49. 2014.
Coussot, et al. "Aging and solid or liquid behavior in pastes". J. Rheol. 50, 975-994. 2006.
Coussot, et al. "Macroscopic vs. local rheology of yield stress fluids". J. Non-Newton. Fluid Mech. 158, 85-90. 2009.
Daubert, et al. "Quantitative measurement of food spreadability using the vane method". J. Texture Stud. 29, 427-435. 1998.
Derakhshandeh, et al. "Rheology of pulp suspensions using ultrasonic doppler velocimetry". Rheol. Acta 49, 1127-1140. 2010.
Dimitriou, et al. "A comprehensive constitutive law for waxy crude oil: a thixotropic yield stress fluid". Soft Matter 10, 6619-6644. 2014.
Dimitriou, et al. "Describing and prescribing the constitutive response of yield stress fluids using large amplitude oscillatory shear stress (LAOStress)". J. Rheol. 57, 27-70. 2013.
Dinkgreve, et al. "Carbopol: from a simple to a thixotropic yield stress fluid". J. Rheol. 62, 773-780. 2018.
Divoux, et al. "Transient shear banding in a simple yield stress fluid". Phys. Rev. Lett. 104, 1-4. 2010.
Ozuy, et al. "Yield stress measurement for concentrated suspensions". J. Rheol. 27, 321-349. 1983.
Fan, et al. "Polysulfide flow batteries enabled by percolating nanoscale conductor networks". Nano Lett. 14, 2210-2218. 2014.
Ferraris, et al. "Role of rheology in achieving successful concrete performance". Concr. Int. 39, 43-51. 2017.
Feys, et al. "Evaluation of time independent rheological models applicable to fresh self-compacting concrete". Appl. Rheol. 17, 1-10. 2007.

(56) References Cited

OTHER PUBLICATIONS

Fielding, et al. "Ageing and rheology in soft materials". J. Rheol. 323, 323-369. 1999.
Fisher, et al. "The bucket rheometer for shear stress-shear rate measurement of industrial suspensions". J. Rheol. 51, 821-831. 2007.
Larson, et al. "A review of thixotropy and its rheological modeling". J. Rheol. 63, 477-501. 2019.
Liddell, et al. "Yield stress measurements with the vane". J. Non-Newton. Fluid Mech. 63, 235-261. 1996.
Lorente, et al. "Tree-Shaped Flow Structures Designed by Minimizing Path Lengths". Int. J. of Heat and Mass Transfer. 45, 3299-3312. 2002.
Ma, et al. "Rheological characterization of mayonnaise. Part I: slippage at different oil and xanthan gum concentrations". J. Food Eng. 25, 397-408. 1995.
Ma, et al. "Rheological characterization of mayonnaise. Part II: flow and viscoelastic properties at different oil and xanthan gum concentrations". J. Food Eng. 25, 409-425. 1994.
Marchesini, et al. "Rheological Characterization of Yield-Stress Materials: Flow Pattern and Apparent Wall Slip". Applied Rheology. 2015.
Medina-Bañuelos, et al. "Rheo-PIV analysis of the vane in cup flow of a viscoplastic microgel". J. Rheol. 63, 905-915. 2019.
Meeten, et al. "Vane techniques for shear-sensitive and wall-slipping fluids", in Theoretical and Applied Rheology 935-937. 1992.
Melito, et al. "Rheological innovations for characterizing food material properties". Annu. Rev. Food Sci. Technol. 2, 153-179. 2012.
Mendes. "Thixotropic Elasto-Viscoplastic Model for Structured Fluids". Soft Matter. 7, 2471. 2011.
Møller, et al. "Yield stress and thixotropy: on the difficulty of measuring yield stresses in practice". Soft Matter 2, 274-283. 2006.
Moonay. "Use of Rotational Vane Rheometry to Solve Practical Problems". American Laboratory. Aug. 1, 2009.
Moreno. "Colloidal processing of ceramics and composites". Adv. Appl. Ceram. 111, 246-253. 2012.
Muth, et al. "Embedded 3D printing of strain sensors within highly stretchable elastomers". 6307-6312. 2014.
Ng, et al. "Power law gels at finite strains☐: the nonlinear rheology of gluten gels". J. Rheol 52, 417. 2008.
Ngo, et al. "Additive manufacturing (3D printing): a review of materials, methods, applications and challenges". Compos. Part B Eng. 143, 172-196. 2018.
Nguyen, et al. "Characterization of yield stress fluids with concentric cylinder viscometers". Rheol. Acta 26, 508-515. 1987.
Nguyen, et al. "Yield stress measurements in suspensions: an inter-laboratory study". Korea-Australia Rheol. J. 18, 15-24. 2006.
Nguyen, et al. "Measuring the Flow Properties of Yield Stress Fluids". Annu. Rev. Fluid Mech. 24, 47-88. 1992.
Oliva, et al. "Simulation of Yield-Stress Fluid in a Rotational Rheometer. The Effect of Vane Geometry on the Accuracy of Measured Properties", Procedings of the 2015 COMSOL Conference. 2015.
Ovarlez, et al. "Flows and heterogeneities with a vane tool: magnetic resonance imaging measurements". J. Rheol. 55, 197-223. 2011.
Owens, et al. "Additively Manufactured Rheometer Vanes with Tailored Geometries for Measurements of Yield-Stress Fluids". Hatsopoulos Microfluids Laboratory. Poster. 2018.
Owens, et al. "High-precision modular microfluidics by micromilling of interlocking injection-molded blocks". Lab Chip 18, 890-901. 2018.
Owens, et al. "Improved Rheometry of Yield Stress Fluids Using Bespoke Fractal 3D Printed Vanes", Journal of Rheology, 64, 643. 2019.
Owens, et al. "Use of Bespoke Fractal 3D Printed Vanes for Improved Rheometry of Yield Stress Fluids". Hatsopoulos Microfluids Laboratory. Poster. 2020.
Ozalp, et al. "Experimental measurement of flow past cavities of different shapes". Exp. Therm. Fluid Sci. 34, 505-515. 2010.
Pashias, et al. "A fifty cent rheometer for yield stress measurement". J. Rheol. 40, 1179-1189. 2002.
Patarin, et al. "Vane and plate-plate rheometry of cheeses under oscillations and large strains: a comparative study and experimental conditions analysis". Int. Dairy J. 38, 24-30. 2014.
Pinkerton, et al. "Field measurements of the rheology of lava". Nature 276, 383-385. 1978.
Potanin. "3D simulations of the flow of thixotropic fluids, in large-gap Couette and vane-cup geometries". J. Non-Newton. Fluid Mech. 165, 299-312. 2010.
Qian, et al. "Distinguishing dynamic and static yield stress of fresh cement mortars through thixotropy". Cem. Concr. Compos. 86, 288-296. 2018.
Raayai. "Geometry mediated drag reduction using riblets and wrinkled surface textures". Massachusetts Institute of Technology. 2018.
Samaniuk, et al. "A Novel Rheometer Design for Yield Stress Fluids". AIChE Journal. 60, Apr. 4, 2014.
Saramito, et al. "A new constitutive equation for elastoviscoplastic fluid flows". J. Non-Newton. Fluid Mech. 145, 1-14. 2007.
Saramito. "A new elastoviscoplastic model based on the Herschel-Bulkley viscoplastic model". J. Non-Newton. Fluid Mech. 158, 154-161. 2009.
Sherwood, et al. "The use of the vane to measure the shear modulus of linear elastic solids". J. Non-Newton. Fluid Mech. 41, 101-118. 1991.
Smith et al. "Maximizing energetic efficiency in flow batteries utilizing Non-Newtonian fluids". J. Electrochem. Soc. 161, A486-A496. 2014.
TA Instruments. "Discovery hybrid rheometer". 3-6. 2016. <url: http://www.tainstruments.com/wp-content/uploads/dhr_brochure.pdf.>.
TA Instruments. "Rheological Techniques for Yield Stress Analysis". RH025. 2016.
Truong, et al. "Vane rheometry for textural characterization of cheddar cheeses: correlation with other instrumental and sensory measurements". LWT—Food Sci. Technol. 35, 305-314. 2002.
Warme. "Software for Computing Steiner Trees". GeoSteiner. 2017.
Warme. "Spanning trees in hypergraphs with applications to Steiner trees". ProQuest Diss. Theses 122. 1998.
Wei, et al. "Reprocessable 3D-printed conductive elastomeric composite foams for strain and gas sensing". ACS Appl. Polym. Mater. 1, 885-892. 2019.
Wei, et al. "Letter to the editor modeling the nonmonotonic time-dependence of viscosity bifurcation in thixotropic yield-stress fluids". J. Rheol. 63, 673-675. 2019.
West, et al. "The fourth dimension of life: fractal geometry and allometric scaling of organisms". Science. 284, 1677-1679. 1999.
Yoon, et al. "Disturbance effect on time-dependent yield stress measurement of bentonite suspensions". Geotech. Test. J. 36, 78-87. 2013.
Zhang, et al. "Measurement of foam modulus via a vane rheometer". J. Rheol. 42, 871-889. 2002.
FormLabs. Materials Data Sheet: Photopolymer Resin for Form 1+ and Form 2. 2017. <url: https://archive-media.formlabs.com/upload/XL-DataSheet.pdf>.
Goshawk, et al. "Rheological phenomena occurring during the shearing flow of mayonnaise". J. Rheol. 42, 1537-1553. 1998.
Grosskopf, et al. "Viscoplastic matrix materials for embedded 3D printing". ACS Appl. Mater. Interfaces 10, 23353-23361. 2018.
Gutierrez-Barranco, et al. "Flow visualizations in a rotating vane rheometer", in Perspectives in Fundamental and Applied Rheology 401-406. 2013.
Herschel, et al. "Konsistenzmessungen von gummi-benzol-losungen". Colloid Polym. Sci. 39, 291-300. 1926.
Jaishankar, et al. "Power-law rheology in the bulk and at the interface: quasi-properties and fractional constitutive equations". Proc R. Soc A 469. 2013.
Joshi, Y. M. and Petekidis, G. "Yield stress fluids and ageing". Rheol. Acta 1-29 (2018). doi:10.1007/s00397-018-1096-6.
Kalpakjian, et al. Manufacturing Engineering and Technology. Pearson, 2013.

(56) References Cited

OTHER PUBLICATIONS

Keentok, et al. "On the shearing zone around rotating vanes in plastic liquids: theory and experiment". J. Non-Newton. Fluid Mech. 17, 23-35. 1985.
Keshavarz, et al. "Nonlinear viscoelasticity and generalized failure criterion for polymer gels". ACS Macro Lett. 6, 663-667. 2017.
Kogan, et al. "Mixtures of foam and paste: suspensions of bubbles in yield stress fluids". Rheol. Acta 52, 237-253. 2013.

* cited by examiner

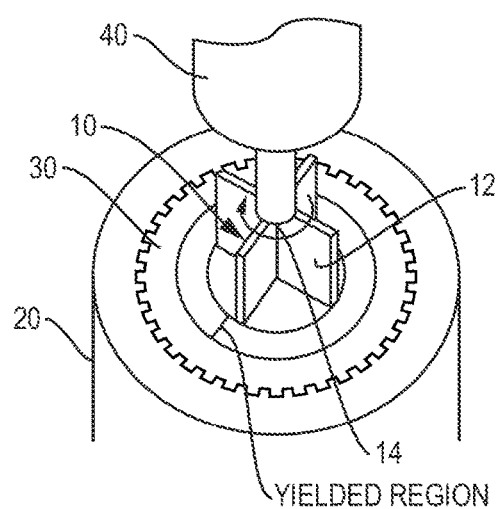
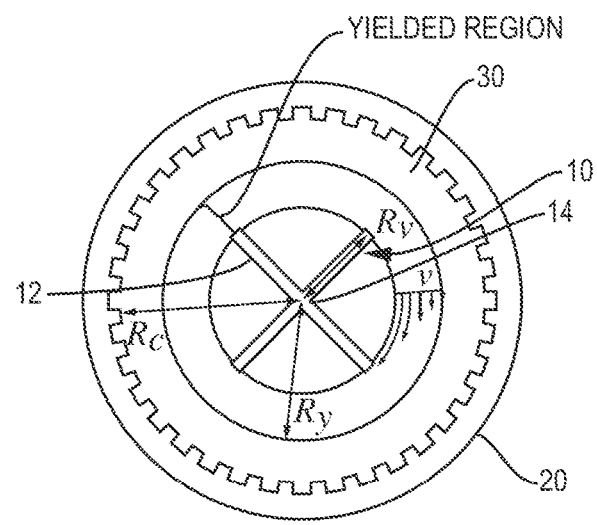
FIG. 1A
(PRIOR ART)
FIG. 1B
(PRIOR ART)
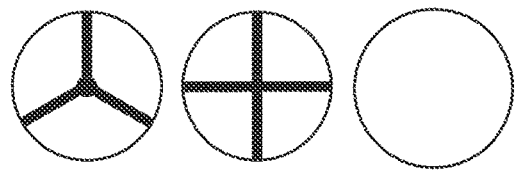
| Type | Vane | Vane | Cylinder |
|---|---|---|---|
| Arms | $N = 3$ | 4 | $\rightarrow \infty$ |
| OAF | 0.12 | 0.16 | 1.00 |
| $OAF_N$ | 0.12 | 0.16 | 1.00 |
FIG. 1C
(PRIOR ART)

SYSTEMS, DEVICES, AND METHODS FOR RHEOLOGICAL MEASUREMENT OF YIELD STRESS FLUIDS USING FRACTAL-LIKE FIXTURES

CROSS REFERENCE TO RELATED APPLICATION

The present disclosure claims priority to U.S. Provisional Application No. 62/915,331, entitled "Improved Rheometry of Yield Stress Fluids Using Bespoke Fractal 3D Printed Vanes," which was filed on Oct. 15, 2019, and which is incorporated by reference herein in its entirety.

FIELD

The present disclosure relates to systems, devices, and methods for making rheological measurements, and more particularly relates to improved rheometric fixtures for measuring various parameters of yield stress fluids.

BACKGROUND

The rheology of a material describes its viscosity as a function of shear rate, temperature, concentration, and other factors. This measurement allows for quantitatively predicting material behavior in a wide variety of processes, including mixing, pumping, squirting, and scooping, and is also useful for quality control. Materials such as yield stress fluids are those that have a critical stress above which it flows like a viscoplastic liquid, and below which it deforms as a viscoelastic solid. Common yield stress fluids include emulsions, foams, particulate suspensions, and granular materials, in which particles, bubbles, emulsions, or other microparticle constituents interact via weak physico-chemical forces and geometric packing/jamming constraints. Some examples of industrial yield stress fluids include shampoo, conditioner, hair gel, lotions, toothpaste, condiments like ketchup and mayonnaise, structural materials like concrete and grout, and more. As the imposed stress acting on these soft solids increases, complex time-dependent rheological signatures arise from underlying microstructural processes such as shear-induced break-down and restructuring. Additionally, other effects can wise such as time-dependent aging and onset of non-homogeneous flow, resulting in common rheological signatures, including a strong influence of the history of deformation, hysteresis, thixotropy, shear-banding, and of slip of the material on the surface of the tool used for rheological measurements. As a result, sensitivity to loading conditions, ensuring kinematic homogeneity, and unambiguous control of history of deformation each pose challenges for rheological measurements of yield stress fluids.

Further, as a result of the complexities encountered in measuring the rheology of thixo-elasto-visco-plastic (TEVP) yield stress fluids, a vane has become the rheometric tool geometry of choice, as it prevents the slip of material and minimizes sample damage/alteration during the sample loading process. The vane geometry for rheometry initially was developed in the 1980s by civil engineers as a tool to quantify the yield stress of soils and thick clays. Work by Nguyen and Boger adapted the vane for muds and slurries and derived a simple quantitative relationship between the torque imposed on the rotating vane and the resulting shear stress acting on the sample. The vane subsequently has become a standard tool for measuring the yield stress of delicate materials and structured fluids.

The vane geometry most typically consists of four to six straight blades of equal length fanning out from a center point in a cruciform or hexagonal arrangement, and "vane" can refer to either the bladed portion of the tool contacting the material being tested or to the entire tool, with the vane most commonly being a fluid-contacting end and a rotor being the entire tool. The vane is submerged inside a cup of the sample material and then rotated about its central axis; the rheometer records the torque and rotation angle. This rotation deforms an approximately cylindrical plug of material, generating an ideally axisymmetric stress field, while also restricting sample slip, which is an issue for cylindrical Couette rotors. The vane, despite its more complex geometry, has been used to impose a range of standard rheometric test protocols, including measurement of steady state flow curves, start-up of steady shear, creep/recoil, small amplitude oscillatory shear (SAOS), and large amplitude oscillatory shear (LAOS). Systematic comparisons of rheological measurements made using vanes to those using other standard rheometric tools can sometimes have some numerical agreement between values measured with vanes and with other geometries, as long as the fluids being measured have significant yield stress, a shear thinning index above 0.5, and no significant thixotropy or history-dependent viscosity. However, many fluids do not conform to those requirements, but still require slip-free measurements enabled by vane-like tools.

Accordingly, there is a need to create improved systems, devices, and methods for reducing recirculation of yield stress fluids between the vane arms and increase the shear stress homogeneity in the fluid close to the vanes without substantially increasing the occluded area fraction of the vane.

SUMMARY

The systems, devices, and methods provided for in the present disclosure are directed to rheometric fixtures for making rheological measurements of yield stress fluids. The rheometric fixtures can include a branched structure having a central location with one or more sets of arms extending therefrom in a fractal-like pattern. In some embodiments, the branched structure can include a first generation of arms that includes one or more arms that extend from the central location with a second generation of one or more additional arms branching from the first set of arms, with the second generation of arms being separately disposed from the central location. The arms can include a plurality of contact points for interacting with a yield stress fluid to take measurements thereof. The branching structure allows inclusion of additional contact points of the fixture while minimizing an area thereof to allow the fixture to be inserted into fluids with less disturbance. The branching meanwhile increases a concavity of internal voids in the vane, which are typically air-filled or fluid-filled when using the vane to measure fluid properties, and result in less deformation of an enclosed fluid. The fixture can be configured to couple to a rheometer to make accurate viscosity measurements of fluids and gels, while the design is optimized for yield stress fluids. In some embodiments, the fixture can be used with a cup that is configured to have a sample of a fluid therein for performing measurements thereof.

One exemplary embodiment of a system for measuring fluid properties includes a fixture having a branched structure. The branched structure has a central location and one or more central arms extending from the central location. The one or more central arms have at least one additional generation of arms branching from the one or more central arms. The at least one additional generation of arms initiates from a location along the one or more central arms that is disposed radially away from the central location.

Each of the at least one additional generation of arms can include a plurality of contact points for interacting with one or more fluids being characterized, with the plurality of contact points comprising a wetted perimeter of the fixture. The at least one additional generation of arms can further include at least one second additional generation of arms initiating from a location along the at least one additional generation of arms. In some embodiments, the at least one additional generation of arms can further include at least one more additional generation of arms initiating from a location along at least one previous generation of arms, with the at least one more additional generation of arms being separately disposed from the central location. Branches between the central location and outer surface can enclose concave regions or cavities that contain the test material during tests. In some embodiments, a space between each central arm and each additional generation of arms can be occlusion-free. The one or more central arms can span less than a full vertical extent of the fixture.

A ratio of the occluded area fraction to the number of outer contact edges of the fixture can be approximately in the range of about 0.01 to about 0.05. In some embodiments, a normalized displaced volume (NDV) of the fixture is approximately in the range of 0.03 to about 0.23. An occluded area fraction of the fixture can be approximately in the range of about 0.10 to about 0.45. In some embodiments, the vane can be devoid of a cruciform shape extending from the central location.

The system can further include a rheometer to which the vane can be configured to couple. In some embodiments, the system can further include a cup configured to have a sample material to be measured disposed therein, with the fixture being configured to be received within the cup. The cup can include a textured inner surface for gripping the sample material. The sample material to be measured can include a yield stress material.

One exemplary rheometric fixture includes a vane with at least one set of internal arms extending from a central location of the vane. At least one arm of the at least one set of internal arms has one or more additional arms branching from it such that no portion of the one or more additional arms extends linearly and/or directly from the central location.

A cross-sectional planform of the fixture emanating from the central location can have a fractal-like geometry. In some embodiments, concave cavities can be present between each arm in the at least one set of internal arms and the one or more additional arms, with the concave cavities having air or a sample material therein.

An occluded area fraction of the fixture can be approximately in the range of about 0.10 to about 0.45. A ratio of a wetted perimeter of the fixture to an occluded area fraction of the fixture can be approximately in the range of about 40 to about 70. At least one set of internal arms or the one or more additional arms can be non-linear.

The fixture can further include a spindle that couples to a rheometer. In some embodiments, the fixture can be manufactured using methods comprising 3D printing. In some embodiments, the fixture can include about eight outer contact points to about twenty-four outer contact points.

One exemplary embodiment of a method for using a rheometric fixture includes placing a sample fluid in a cup and testing the sample fluid by contacting the sample fluid with a plurality of contact points of a vane. The plurality of contact points are disposed at distal terminal ends of arms that have proximal terminal ends emanating from another arm of the vane. The method further includes rotating the vane within the sample fluid to measure one or more of torque or rotation angle of the vane in the sample material.

In some embodiments, at least some of the arms on which the plurality of contact points are disposed do not extend directly from a central location of the vane. The method can further include detaching the vane from the cup and disassembling the cup after measurement of the sample fluid is performed.

BRIEF DESCRIPTION OF DRAWINGS

This disclosure will be more fully understood from the following detailed description taken in conjunction with the accompanying drawings, in which:

FIG. 1A is a schematic perspective view of a prior art vane inserted into a cup for yield stress material for measurement;

FIG. 1B is a schematic top view of the prior art vane of FIG. 1A causing shearing of the yield stress material within the cup;

FIG. 1C schematically illustrates various embodiments of prior art vanes;

DETAILED DESCRIPTION

Figure 2:
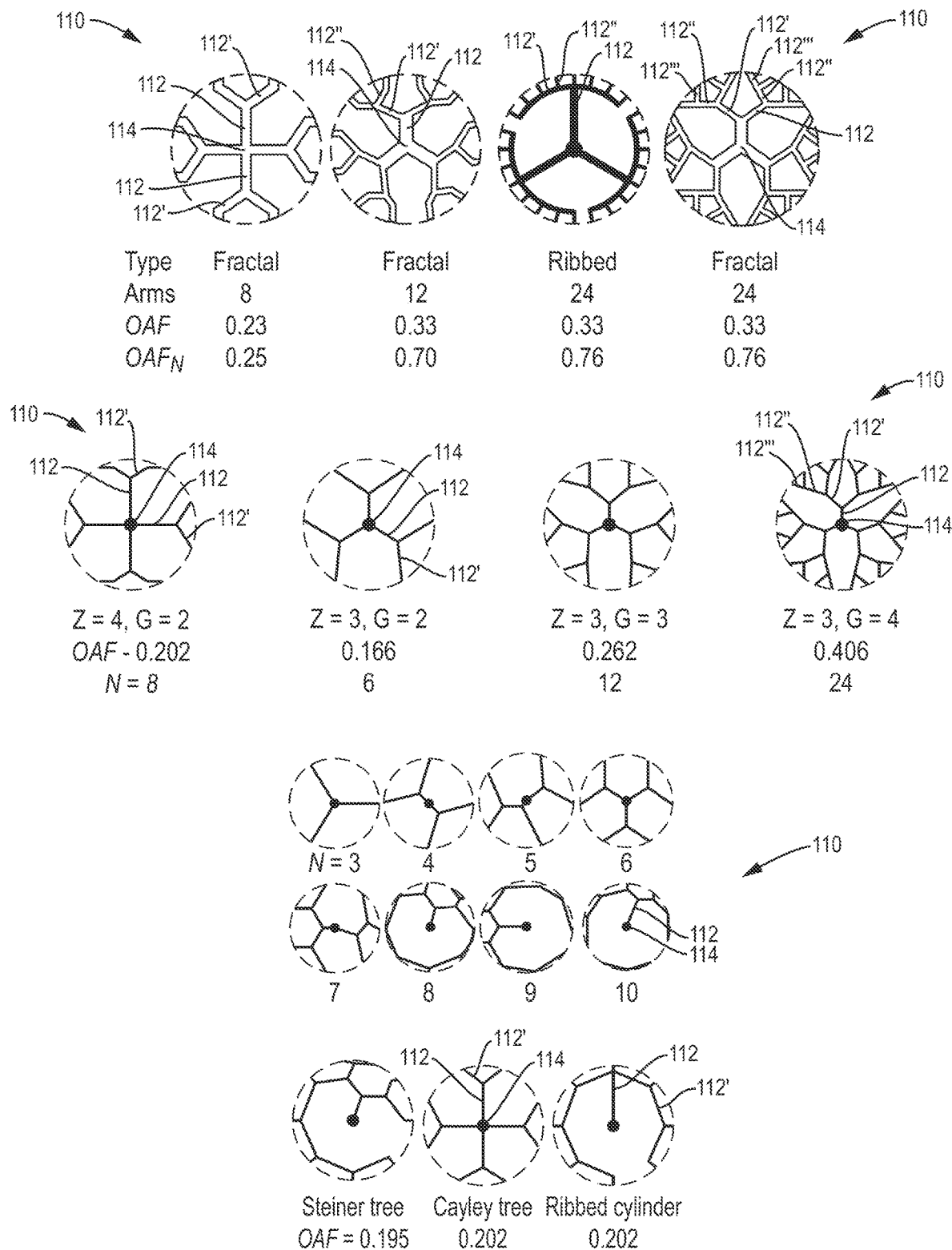
FIG. 2 schematically illustrates various exemplary embodiments of vanes within the scope of the present disclosure.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent a term like "fractal" or "fractal-like" is used herein, a person skilled in the art, in view of the present disclosure, will understand that it includes a design that branches for two or more generations in a fractal-type or -like pattern, understanding that fractals can go on infinitely but the instantly disclosed designs can continue in fractal-like patterns for several generations. Additionally, a person skilled in the art will recognize that the term "fractal structure" refers to a construction having one or more core branches extending axially that break into multiple arms, as described and illustrated in greater detail below.

Further, to the extent the term "cruciform" is described in the present disclosure, a person skilled in the art will recognize that it refers to a shape that resembles a wind turbine or a cross, among other shapes recognizable by those skilled in the art in view of the present disclosure. Typical examples of the cruciform shape can have three arms disposed in a triangular arrangement, four arms disposed in a cross arrangement, or six arms that are disposed in a hexagonal arrangement. The arms of the cruciform shape can typically be straight, though, in some embodiments, one of the arms of the cruciform shape can be curved.

Further, to the extent features, sides, or steps are described as being "first" or "second," such numerical ordering is generally arbitrary, and thus such numbering can be interchangeable. Still further, in the present disclosure, like-numbered components of various embodiments generally have similar features when those components are of a similar nature and/or serve a similar purpose. Lastly, the present disclosure includes some illustrations and descriptions that include prototypes or bench models. A person skilled in the art will recognize how to rely upon the present disclosure to integrate the techniques, systems, devices, and methods provided for into a product in view of the present disclosures.

The present disclosure generally relates to systems, devices, and methods for design, fabrication, and use of a fixture for making rheological measurements, i.e., measurements (e.g., yield stress) pertaining to the deformation and flow of a material. The fixture can be in the shape of a vane having a fractal-like structure, including a central spindle with core branches extending axially from the spindle, one or more of the core branches breaking into multiple arms. The spindle can be circularly symmetric.

A person skilled in the art will recognize that the vanes disclosed in the present disclosure are structurally different from conventional vanes provided for in the prior art. For example, unlike existing embodiments of vanes having one or more arms that emanate from a single central location in a cruciform shape, the vanes of the present embodiments have a fractal-like structure that includes one or more arms that originate at one or more of the existing arms. This configuration provided herein provides a larger number of contact points at the edge of the vane while minimizing the occluded area of the fixture. The branching, tree-like fractal structure can be optimized to give a large surface area and large number of perimeter contact points with material to be tested, e.g., a test fluid, while the internal structure remains sparse in terms of displaced volume relative to a bob to limit pre-shearing of a structurally-sensitive material during sample loading. In particular, the series of fractal-like branched structures, which in some instances may be referred to as vane structures, are designed to minimize material displacement when loading the tool into the sample material, making this structure uniquely better in some situations than current tools. Some non-limiting examples of terms that can be used to describe the structures of the present embodiments in lieu of and/or in addition to the term "vane," and are described as being "vanes" for purposes of brevity throughout the instant application, can include a snare, e.g., fractal snare, snare cup, a thixometer, e.g., fractal thixometer, cup thixometer, props, e.g., propellers such as thixometer prop, biprop, octo-prop, icosatetra-prop (24), a rotor or lace rotor, a venous rotor, miter, grapnel, mesh anchor, fractal (fractal-rotor), fractal anchor, dumbbell anchor, firefly, tractor (traction rotor), dendril (tendril), trap, slip-trap rotor, grip-n-grab rotor, antler rotor, Vaneomous Tentacula, Velcro vane, Gecko foot, fluid snare, soft matter snare, dreamcatcher, streamcatcher, creamcatcher, branching capillaries, arterial occlusion, octopus, Electron tree, Lichtenberg fractal, Burr rotor, Articule (from articum), stirrolator, swimmer spinner, e.g., the slimmer swimmer spinner, and/or a STAR rotor (Slip-free testing advantage rotor rotor), among others. Therefore, even though the term "vane" is used to describe the fixtures of the present embodiments, the instantly disclosed structures are different from those previously known to a person skilled in the art, although a term different than "vane" may or may not be used herein and the differences between prior art vanes and what is provided for herein will still be understood by a person skilled in the art. The instantly disclosed embodiments can create a more homogeneous stress field, reducing the level of error in measurements, and improving quantitative accuracy in measuring yield stress. The partially enclosed cavities formed within the fractal-like structures additionally limit recirculation of enclosed fluids during measurements, and the disclosed embodiments can create more precise measurements of the viscosity of less viscous fluids.

In some embodiments, the instantly disclosed embodiments can be three-dimensionally (3D) printed rather than machined out of metal, which allows for production at a much lower cost and at a more rapid rate. In some embodiments, the vane can be used with a cup to improve convenience and versatility of the entire testing procedure. For example, the cup can hold the sample material being tested, and can include a textured inner surface for gripping material. The cup can be detachable from a rigid base, as a cylinder without a bottom, making it easy to load and clean thicker or gelling samples. The base can be designed to facilitate attachment of different cups thereto. In other embodiments, the vane can be used directly in a large vat of fluid or in a cup of various shapes.

Rheology of Yield Stress Fluids and Prior Art

The generic term "yield stress fluid" typically applies to a fluid that exhibits a characteristic stress below which it may deform viscoelastically (i.e., as it creeps) but does not flow, and above which it flows steadily like a (typically shear-thinning) liquid. In addition to the role of a critical material stress, time-dependent degradation and rebuilding of the underlying material structure may occur, leading to complex rheological responses that depend both on time and on sample history.

The simplest constitutive model appropriate for describing the steady flow curve of yield stress fluids is the Hershel-Bulkley model, $$\sigma(\dot{\gamma}) = \sigma_y + k\dot{\gamma}^n \quad \sigma \geq \sigma_y$$

$$\dot{\gamma} = 0 \quad \sigma < \sigma_y \quad (1)$$

where $\sigma$ is the shear stress, $\sigma_y$ is the yield stress in shear, k is the consistency index, $\dot{\gamma}$ is the shear rate, and n is the power law index. When n=1, this corresponds to a Bingham fluid, with k→μ being the plastic viscosity. While many more complex models exist that can account for viscoelastic responses below yield as well as time and rate-dependent thixotropic responses (e.g., the soft glassy rheology model, the isotropic kinematic hardening model, and models by Saramito and Coussot), the simple Herschel-Bulkley viscoplastic model is sufficient for comparison with the results of steady state measurements presented herein.

FIGS. 1A-1C illustrate an exemplary prior art vane 10. As shown, and as discussed above, the vane 10 has arms 12, as shown four, of equal length fanning out from a center point 14 in a cruciform arrangement. In use, the vane 10 can be inserted into a cup 20 having a yield stress material 30 therein. Following insertion, the vane 10 can be rotated, which causes the shearing of the material 30 to exert a torque on the vane 10. This rotation deforms an approximately cylindrical plug of material, generating an ideally axisymmetric stress field, while also restricting sample slip, which is a key issue for cylindrical Couette rotors. The vane 10 has been used to impose a range of standard rheometric test protocols, including measurement of steady state flow curves, start-up of steady shear, creep/recoil, small amplitude oscillatory shear (SAOS), and large amplitude oscillatory shear (LAOS). Systematic comparisons of rheological measurements made using vanes to those using other standard rheometric tools generally have found good numerical agreement between values measured with vanes and with other geometries. Meanwhile, any differences in measured values typically occur due to wall slip and differing sample history, affecting primarily large strain measurements and general level of repeatability in data measured with vanes compared to other non-cruciform shapes. In particular, for bentonite, direct comparisons have revealed that cone-and-plate tests systematically underestimate yield stress as compared with vanes, due, at least in part, to thixotropy associated with sample loading; for foams, SAOS measurements with vanes agree well with measurements made with parallel plate fixtures, while vanes induce less bubble coalescence; for soft cheeses, SAOS measurements with a parallel plate geometry agree well with vanes, though only vanes were capable of imposing reproducible larger-amplitude strain deformations due to sample slip occurring against the parallel plates. In direct comparisons of inter- and intra-laboratory tests, yield stress measurements made with vanes in start-up of steady shear tests have been found to be more reproducible than measurements made by other tools including slump tests on inclined planes, or creep experiments or stress ramp tests with cones and textured concentric cylinders.

The torque can then be measured as a function of rotation angle and rate by a rheometer 40 to which the vane 10 is coupled. Due to the presence of a yield stress in the material being measured, the sample in the cup deforms as a sheared cylinder guided by the vanes, preventing slip and generating kinematics that closely approximate those of a concentric cylinder system.

As shown in FIG. 1B, the local stress decays radially from the cylinder of material 30 cut by the vane, out to a radius $R_v$, where $\sigma(r) = \sigma_y$. Inside the vane boundary $r < R_v$, material ideally moves as a solid plug guided by the vane arms, and the radial velocity v(r) decays from $v = \Omega R_v$ at the edge of the vane to $v = 0$ at $r = R_v$, although the velocity profile is expected to deviate from an axisymmetric path, especially if the vane has few arms. While the vane geometry is well suited for measuring the instantaneous torque $M_y$ (and the corresponding yield stress $\sigma_y$ at the instant of yielding), the streamlines become noncircular when measuring strongly shear-thinning materials at higher shear rates, or for measuring viscous Newtonian fluids, due to secondary flows (i.e., slow recirculation of fluid eddies) between the vane arms. That is, the fluid-filled space between each pair of vane arms functions as a lid-driven cavity with a slow steady recirculating flow that contributes additional dissipation to the total measured torque.

Further, the stress field in the sheared sample is non-uniform and localized around the perimeter at the edges of each arm of the vane 10. In fact, analysis for the stress field (in a Newtonian fluid or a linear elastic solid) near a knife-edge singularity in torsional deformation shows that at each arm tip there is a stress singularity that scales inversely proportionally to the number of vane arms. By increasing the number of tips in contact with outer fluid, the stress field becomes progressively more homogeneous along circles of constant radius from the vane center.

The shearing profile around the vane is axisymmetric only for certain materials and under specific flow conditions. Secondary flows arise when the viscosity is too low, resulting in recirculation between neighboring pairs of arms; these are exacerbated when the power-law index of a shear thinning fluid is >0.5 (more Newtonian); and when the vane has too few arms to hold a given material securely (typically needing greater than three arms) and flow kinematics are measurably influenced even with six arms. For viscoelastic materials, this recirculation has been shown to cause a significant artificial increase in the apparent viscosity reported by the instrument at high Reynolds numbers. Detailed theoretical and computational analysis of the region near a single knife-edge of a vane reveals that the stress field is singular at the tip, and consequently the stress field around a multi-arm vane tool shows spatially periodic variations for any material with Newtonian, yield stress, or linear elastic behavior. Consequently, even when the streamlines in a sheared fluid sample are circular, instantaneous structural parameters characterizing the local properties of thixotropic fluids can be strongly influenced by the location of the blades, becoming non-axisymmetric with the vane rotation.

Vanes with a larger number of arms that extend from a central location can lead to errors in measurement. For example, adding more arms to the vane 10 displaces and disturbs more material when the vane 10 is inserted into a sample, which has been shown to lead to underestimations of the yield stress, and may make measurements on thixotropic fluids that exhibit a strong memory of their initial deformation history during loading less repeatable. To quantify this effect and explore it systematically, we define the occluded area fraction (OAF) as the cross-sectional area of fluid displaced by an N-arm vane normalized by the area of a circle with the same outer radius:

$$\text{OAF} \triangleq A_{vane}/\pi R_v^2. \quad (2)$$

As shown in FIG. 1C, the OAF for a three-arm vane can be 0.12 while that of a cylinder is 1.00, as the cylinder displaces an amount of fluid proportional to the full cross-sectional area of the cylinder. A person skilled in the art will recognize that computing numerical values of this expression obviously depends on N as well as the thickness t of each vane. For example, a 4-arm vane with a thickness of $0.13R_v$ (typical of commercial vanes) has an OAF of $4 \times 0.13/\pi = 0.16 = 16\%$. In addition to displaced area, more complex material systems (e.g., thixotropic fluids or multiphase systems with large particulate inclusions) may also be influenced by the overall branched structure and by loading procedures such as speed of insertion of the tool. Cross-sectional profiles of conventional vane designs are shown in FIG. 1C, along with numerical values of OAF for each design, and corresponding values for vanes with N straight radial arms (denoted $\text{OAF}_N$ for clarity). Despite the above-mentioned difficulties and/or errors, vanes are particularly useful for ensuring repeatability of measurements and for characterizing structurally-sensitive materials. This is at least because vanes displace far less material and impose a much weaker deformation history during initial sample loading, which is particularly important for thixotropic samples. With a cone-and-plate, parallel-plate, or concentric-cylinder tool configurations, the sample must be compressed and sheared to fill the thin gap between the two fixture surfaces. Compared to a bob, a vane can more easily be inserted into a cup that has been previously filled with a structured material, and the vane typically displaces less than 20% of the sample volume compared to a bob of equivalent radius. A person skilled in the art will recognize that a bob is a solid cylinder that is configured to be used inside a cylindrical sample cup. The fluid is tested in the annulus between these two concentric cylinders with a rheometer motor and torque sensor connected to one or both objects. The resulting torque on the rheometer is measured, allowing shear force at the bob surface to be calculated. This results in more repeatable measurements and control of the initial shear history for the material. Furthermore, use of vanes allows samples to be prepared and aged in containers for long waiting times before testing on the rheometer.

Alternatives to the vane geometry that have been proposed for yield stress fluids include paired helical blades for preventing sedimentation while measuring dense samples such as concrete with large aggregates, torsional mixers, and planetary rotating systems, along with other styles of test including penetration and slump tests. Due to their easy insertion into fluids, four-armed vanes also find wide-spread use in field tests for industrial measurements, with designs for "bucket rheometers" for concrete and industrial slurries powered by a hand drill and a similar extended rod for in situ or "syn-eruptive" measurements of lava flows oozing from active vents, where the magnitude of the yield stress is a strong indicator of probability of eruption.

Rheometric tools are typically manufactured via machining of aluminum or of stainless steel. The introduction of a new fractal-based vane geometry utilizes a manufacturing method that can achieve complex features without excessive cost, and that is capable of creating thin and closely-spaced features such as the profiles shown in FIG. 2, which are discussed in greater detail below. Three-dimensional (3D) printing is exceptionally well suited for this task, as its layer-by-layer nature allows complex geometries to be created in three dimensions with, ideally, minimal post-processing or shaping. In particular, designs such as these extruded vanes that are geometrically complex with fractal-like patterns along a single axis and without overhanging features can be printed with high quality using stereolithography. Manufacturing thin, high-aspect ratio cavities by other methods such as machining, injection molding, or casting would be more challenging.

FIG. 2 illustrates embodiments of a family of fixtures 110 having fractal vane geometries that are characterized by the number of arms N. The fixtures 110 can include a fractal-like internal structure in that the fixtures of the present embodiments include one or more arms 112 that extend from a root location 114, as shown centrally disposed as a central location. The arms 112 can be considered to be extending linearly or directly from the root location 114. A person skilled in the art will recognize that while the root location 114 is central within the fixture 110 in the illustrated views, it may not be centrally disposed relative to a height of the fixture. Moreover, in some embodiments, the root location 114 can be offset from the central location. It will be appreciated that although the term central location can be used in the instant specification, the location from which the arms eminate need not always be "central" within the fixture.

The cross-sectional planform emanating from the central location can include a fractal-like internal structure that can reduce recirculation of fluid between the vane arms and increase the shear stress homogeneity in the sample close to the vanes without substantially increasing the occluded area fraction of the vane. The fixtures 110 of the present embodiments, unlike the vanes of the prior art, are not in a cruciform arrangement. Rather, the presently disclosed fixtures 110 include a fractal or fractal-like internal structure. As shown, the fractal internal structure can include one or more additional branches of arms 112' that originate from the arms that extend from the central location of the fixture. These additional branches of arms 112' can create a second generation of arms that extend the surface area of the fixture 110 while maintaining a larger surface area-to-volume ratio to the tool, leading to improved axisymmetry of the yield surfaces at the point of yielding and a more accurate determination of the yield stress.

Fractal internal structures are also advantageous for fitting into small spaces due to a small cross-sectional area as compared to number of contact points. The contact points as applied to the instantly disclosed embodiments include the solid portions of the vane at $r=R\_v$, and can be surfaces and/or edges thereof, and are quantified by the number of arms N. For example, the number of contact points of the present embodiments can be approximately in the range of about six to about forty-eight, or in the range of about eight to about twenty-four outer contact points. The branching, tree-like fractal structure was designed to give a large wetted perimeter, e.g., surface area divided by the radius, relative to the occluded area fraction, and large number of contact points with the test fluid, while the internal structure remains sparse in terms of displaced volume relative to a bob, to limit pre-shearing of a structurally-sensitive material during sample loading. The gaps or spaces between each central arm and each additional generation of arms can be substantially occlusion-free such that test fluid can fill these spaces during testing of the material and less fluid is displaced. A person skilled in the art will recognize that substantially occlusion-free suggests that there is no material of the fixture in these spaces such that fluid and other test material can flow freely therebetween. For example, the branches between the root location 114, or primordial spoke, and an outer surface encloses concave regions or cavities that contain the test material during tests. For example, a ratio of the wetted perimeter to an occluded area fraction of the fixture can be approximately in the range of about 30 to about 100, though in some embodiments the ratio can be approximately in the range of about 40 to about 80, or approximately in the range of about 40 to about 70. Moreover, a ratio of the occluded area fraction to the number of outer contact edges of the fixture can be approximately in the range of about 0.01 to about 0.05. A person skilled in the art will appreciate that other values for these parameters are possible.

The branching meanwhile increases the concavity of internal voids in the vane such that one can draw some radial line from the center point of the vane to the outer perimeter, pass through a void along that line, and re-encounter at least one solid vane branch at a greater radius. These voids are typically fluid-filled when using the vane to measure the fluid properties, and result in less deformation of this enclosed fluid, reducing errors in measurement.

By analogy to the OAF, the normalized displaced volume (NDV) is a measure that can be quantified as the OAF normalized by the number of arms in the vane, N, and the thickness t, and multiplied by the vane radius R_v. The NDV illustrates that the area/contact point ratios are reduced by means other than reducing a thickness of the arms, though in some embodiments, a thickness of the arms can be reduced. For example, a 4-arm vane with a thickness of $0.13R_v$ (typical of commercial vanes) has an NDV of $0.16/(4\times0.13)=0.31$.

$$NDV = \frac{(OAF)R_v}{Nt} \quad (3)$$

Values of NDV of the present embodiments can less than 0.23 while radiating linear structures of the prior art are commonly 0.24 or greater. One skilled in the art while recognize that this expression provides a method for intercomparison of different designs with very little sensitivity to the arm thicknesses and number of arms, instead emphasizing the impact on fluid displacement from the design itself.

This class of modified vane fixtures with fractal-like cross-sectional structures enables robust rheological measurements of the properties of yield stress fluids. A greater number of outer contact edges leads to increased kinematic homogeneity at the point of yielding and beyond. When using the vane fixtures, the torque measured at each rotation rate increases with the number of outer contact points with the fluid.

In some embodiments, the fractal designs of the present embodiments can be based on finite Bethe lattices. As shown in FIG. 2, which includes nineteen examples of intricate structures in accordance with the present disclosures, these fractal internal structures can be parameterized by a number of initial branches or arms from a center (Z), the number of layers or generations (G), and the number of new branches emerging from a single branch with each successive generation. As shown, each arm 112 from the center (Z) can include one or more additional arms 112' extending therefrom as an additional generation or set of arms. The number of arms from the center in some embodiments can range from three to 10, as shown in FIG. 2, though in some other embodiments ten or more arms 112 can extend from the central location 114 in some embodiments. Moreover, while the fixtures 110 are shown having two or more generations of additional arms 112', 112'', in some embodiments the fractal-like pattern can extend for five or more generations, e.g., 112', 112'', 112''', 112'''', 112'''''. A person skilled in the art will recognize that this numbering convention can apply to subsequent generation of arms throughout the embodiments of the present disclosure. The additional arms 112' can be separately disposed from the central location 114 such that the additional arms 112' do not emanate therefrom to form the fractal-like structure of the fixtures 110.

A person skilled in the art will recognize that although the arms are described as eminating from a central location, in some embodiments the arms 112 can eminate from a non-central location, i.e., offset from center, with the additional arms 112' not eminating from the same location from which the arms 112 eminate. That is, the additional arms 112 can be separately disposed from the central location 114.

In some embodiments, the radius ratio of the generations of each subsequent layer can be optimized to minimize the total length of the vane arms. Here, $\beta=r_{i+1}/r_i$ where r is the radius of layer i and $\beta \geq 1$. If $\beta=1$, a version of the ribbed cylinder is recovered. If $\beta \to \infty$, the straight-armed vane can be recovered.

The fractal structure can create spaces or voids 116 between each arm 112 and/or the one or more additional branches of arms 112'. The spaces allow for insertion of the fixture 110 into fluids, causing less disruption due to a smaller cross-sectional area and fewer shearing surfaces, while preventing recirculation of fluid when the vane is characterizing the fluid. The voids 116 also allow the fluid into which the fixture 110 is inserted to flow therethrough rather than be displaced, which is quantified as the OAF, as discussed above. For a vane with N straight arms of constant thickness t radiating from the center point, the total occluded area is approximately:

$$A = NRt. \quad (4)$$

Even for thin vane arms with $t \ll R_v$, if Nt is large, a circular core of the structure is solid to a radius $R_1 = Nt/2\pi$, and the occluded area is $$A = \pi R_1^2 + N(R-R_1)t. \quad (5)$$

Another possible shape is a ribbed cylinder, as shown in FIG. 2. For this structure, Z branches can extend from the central point to N equally spaced points along the outer perimeter connected by chords. The filled area is minimized by drawing a regular polyhedron with N sides between outer points, connected by one line to the base. The area of that structure is:

$$A = Rt[2(N-Z)\sin(\pi/N)+Z]. \quad (6)$$

Three additional potential designs of an 8-armed vane with corresponding values of OAF listed are shown (labeled "Steiner tree," "Cayley tree," and "ribbed cylinder." While the Steiner tree has an optimal OAF, a basic fractal configuration and ribbed configuration are only 4% more space-filling, and are also considered exemplary compared to a straight-armed design having eight arms, which fills 30% more space. The more structured, space-filling fractals are more suitable than the hollow ribbed structures both for limiting recirculation (by minimizing the distance between any two nearest walls) and for increasing mechanical strength against torsional deformation of the vane features during imposed shearing in stiff materials. An occluded area fraction of the fixtures of FIG. 2 can be approximately in the range of about 0.10 to about 0.5, or approximately in the range of about 0.1 to 0.45, or approximately in the range of about 0.13 to 0.45, to reduce recirculation of yield stress fluids between the vane arms and increase the shear stress homogeneity in the fluid close to the vanes. Similarly, the normalized displaced volume of the fixtures of FIG. 2 can be approximately in the range of about 0.03 to about 0.23 or approximately in the range of about 0.12 to about 0.29. Advantages of vanes having an occluded area fraction and normalized displaced volume in this range can include a more homogeneous stress field, reducing the level of error in measurements, and improving quantitative accuracy in measuring yield stress.

Figure 3A:
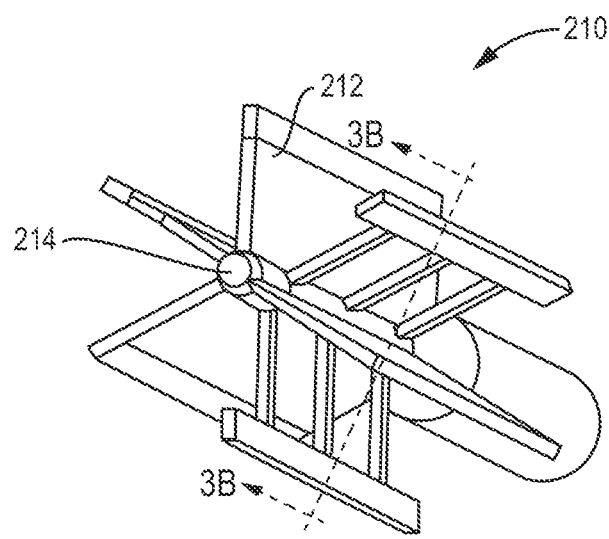
FIG. 3A is a perspective view of one exemplary embodiment of a single-gap vane.
Figure 3B:
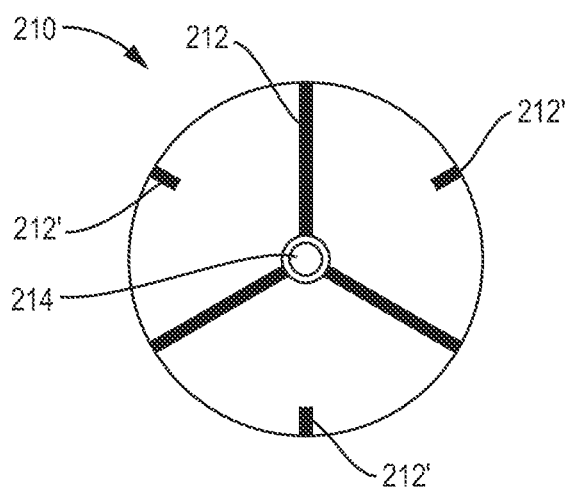
FIG. 3B is a cross-sectional top view of the single-gap vane of FIG. 3A taken at a first location.
Figure 3C:
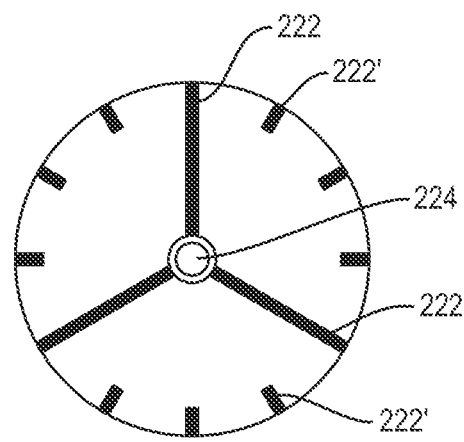
FIG. 3C is a cross-sectional top view of an alternative single-gap vane taken at a first location.
Figure 4A:
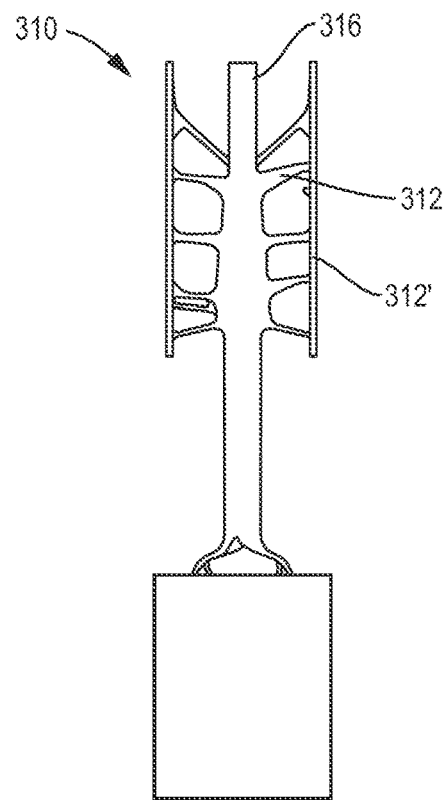
FIG. 4A is a front perspective view of another exemplary embodiment of a vane having a central branch coupled to a base.
Figure 4B:
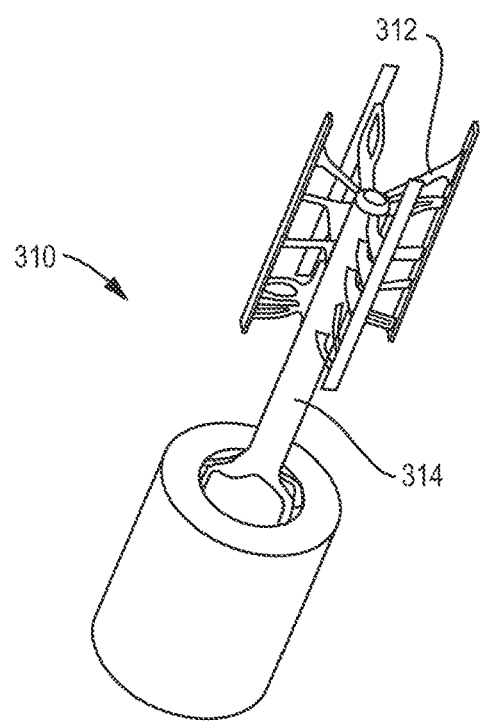
FIG. 4B is a perspective view of the vane of FIG. 4A.
Figure 4C:
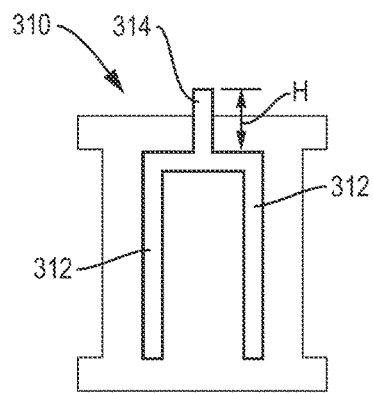
FIG. 4C is a schematic side view of a double-gap vane.
Figure 4D:
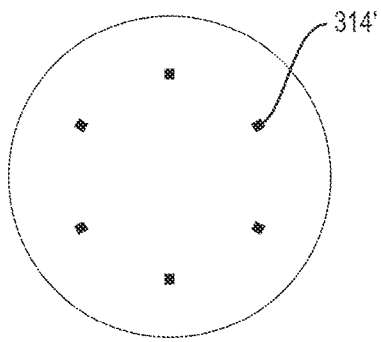
FIG. 4D is a cross-sectional top view of the double-gap vane taken at a first location.
Figure 4E:
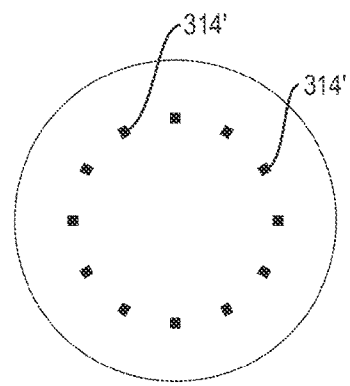
FIG. 4E is a cross-sectional top view of a second double-gap vane taken at a first location.

FIGS. 3A-3C provide exemplary embodiments of a vane 210 having a single gap between a plurality of arms 212 and the outer cup, between which the measured fluid is sheared. As shown, a vane 210 can include a central branch 214 having multiple arms 212 that extend from one or more points in a vertical extent of the vane. The central branch 214 can extend through an entire length of the whole tool with arms extending from various locations along the central branch 214. FIG. 3B shows a cross-section taken across a line B-B in FIG. 3A in a first location and illustrates the central branch 214 having three arms 212 and three additional arms 212' separated by a gap for a total of six contact points. Alternatively, FIG. 3C illustrates a cross-section taken of a different exemplary embodiment which includes three arms 222 and nine additional arms 222' for a total of twelve contact points. The non-constant cross-section can therefore further minimize the cross-sectional area occluded by the vane while maintaining many contact points for improved fluid measurement as the central branch 214, 224 of the vane does not occlude any area in the fluid. A person skilled in the art will recognize that the number of contact points illustrated herein is merely exemplary and can be varied. Due to the connection to the arms being different, there can exist a single measuring surface if there are some central arms radiating outwards, as shown in FIG. 3A and all previous examples, or two measurement surfaces, which include the circles inscribed by and circumscribing the solid beams, if there are no central arms for at least most of the vertical extent, as shown in FIGS. 4D-4E. In some embodiments, the arms can span less than the full vertical extent of the branched structure, leading to some planar cross-sections with disconnected contact points. The instant embodiment includes a gap between an outermost circular perimeter (at r=R_v) of the vane and a cup. The double gap vane 310 includes the same gap as the single vane embodiment plus the gap between the vane's innermost circular perimeter and either the center of the cup and/or equivalently the center of rotation of the vane, or a stationary vertical cylindrical spike in the bottom of the cup to enable the vane to rotate relative to the solid inner wall.

FIGS. 4A-4E illustrate an embodiment that includes a double gap vane 310 having a plurality of arms 312 that extend from a central branch 314 and vertical extents 314' extending therefrom. As shown, the central branch 314 can have a height H that terminates at a distal portion of the arms 312 with the arms 312 extending distally from a terminal end of the central branch 314. The height H of the central branch 314 can be smaller than that of the arms, as shown, such that the central branch 314 does not contact the fluid, sample, thereby not causing displacement of the fluid so as not to increase the occlusion area fraction. When the central arm is substantially removed, the notable distinction of the double gap vane is allowing for a greater total measuring surface between the contact points and the material disposed exterior to the vane, and between the contact points and the material disposed interior to the vane, which can increase measurement sensitivity. That is, the shearing surface for measurement can be exterior to the vane or both exterior and interior to the vane. The use of this type of configuration, where the root location is displaced from a plane extending through the contact points, can be used in conjunction with any of the embodiments provided for herein or otherwise derivable from the present disclosures. In some embodiments, the root location can lie in a separate plane from the contact points of one or more of the arms 312 in that the root location lies vertically above and/or below a plane that passes through one or more of the arms (e.g., the plane being substantially aligned with "the paper" when viewing images like those in FIGS. 2, 3B, and 3C). Further, the normalized displaced volume of the fixtures of FIGS. 3A-C and FIGS. 4A-E can be approximately in the range of about 0.03 to about 0.23 or approximately in the range of about 0.03 to about 0.18.

The vanes can be manufactured using machining of metals, though, in some embodiments, the vanes can be manufactured using cost-effective 3D printing of various materials, including extrusion of plastics or metals. For example, vanes can be manufactured by stereolithographic 3D printing, using an acrylate-based photopolymer able to create vanes with fine (e.g., approximately <200 μm) feature resolution and with chemical compatibility with a broad range of solvents and sample materials. The vanes can be 3D printed using a desktop stereolithography machine, making them inexpensive (disposable), chemically-compatible with a wide range of solvents, and readily adaptable as a base for further design innovations. Specifically, vanes and textured cups, discussed in greater detail below, made by desktop stereolithography can be used to obtain rheological measurements that are consistent with "reference" measurements made by machined cone-and-plate geometries with carefully roughened surfaces to eliminate slip. Moreover, expressions for interconverting between measured torque and sample shear stress for a general vane with any number of equally spaced arms, as well as for converting between rotation rate and shear rate for a wide-gapped vane-in-cup configuration, are discussed below:

The torque-to-shear stress conversion is:

$$\sigma = \frac{M}{2\pi R_v^2 L\left[\left(1-\frac{1.113}{N}\right)+\frac{R_v}{4L}\left(2.75-\frac{3}{\sqrt{N}}\right)\right]}, \quad (7)$$

and the shear rate conversion at steady state is:

$$\dot{\gamma} = \frac{2\Omega}{d\ln M / d\ln\Omega}. \quad (8)$$

The derivative d ln M/d ln Ω is computed from the measured torque-speed curve for a sample under study.

Stress conversion factors derived for an N-arm straight-armed vane accurately convert measurements even from a fractal structure with N circumferential points. This is due, at least in part, to the presence of the yield stress, which "cloaks" or hides the internal structure of the vane from the yielded region so that only the number of outer contact edges, and not the internal structure of the vane, affects the yield profile. The remainder of the material plug trapped between the N arms can rotate with the vane being a rigid body.

Figure 5A:
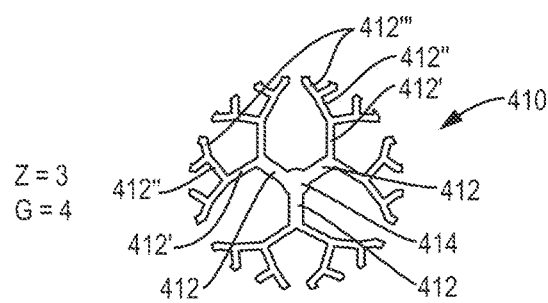
FIG. 5A is an exemplary embodiment of an input fractal-like shape design for a vane to be three-dimensionally printed.
Figure 5B:
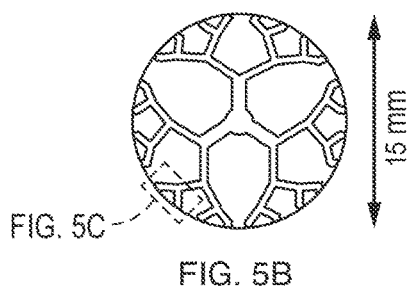
FIG. 5B is a three-dimensionally printed fractal-like vane fixture.
Figure 5C:
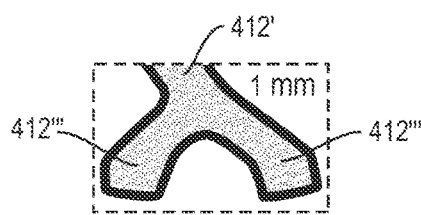
FIG. 5C is an optical micrograph of one edge of the printed design of FIG. 5B.

3D printing is well-suited to create functional vane-like geometries, compared to other manufacturing methods, due, at least in part, to the need to produce fine (typically <about 200 μm) features used in vanes with very high aspect ratios that retain dimensional accuracy over centimeter length scales. Herein, a design, fabrication, and use of a 3D printed fractal-like vane geometry is presented. FIGS. 5A-5C illustrate an exemplary embodiment of a design, fabrication, and use of a 3D printed fractal-like vane geometry. FIG. 5A illustrates an input fractal shape design 410 having arms 412 extending from a central location 414 and FIG. 5B illustrates a photograph of the fabricated 3D part. As shown, the fixture 410 can include three arms 412 extending from the central location 414 (Z), with three sets of additional arms 412' for a total of four generations (G). The part can be 3D printed with precision to achieve an intricate design, as shown in FIG. 5C, where one edge of the printed design can show an ~200 μm feature resolution achieved with 3D printing.

The total runout of the vanes was measured to be approximately in the range of about 0.4 mm to about 0.7 mm at the end of the vane after fitting the printed vanes with an M4 nut as a threaded insert, and without any other post-processing. The printable rheometer coupling is readily adaptable to future design innovations and other rheometer-mounting systems. Such concepts may include designs to minimize moments of inertia, to fit various rheometer and cup geometries, to sharpen or taper the lower surface of each vane arm for easier insertion into soft solids, and/or to adjust texture, compliance, or porosity for tailoring of specific measurement needs, among other concepts.

Vanes with consistent, reliable dimensions can therefore be manufactured using a commercially-available desktop 3D printer, yet when using a new 3D printer or a new print material it can be prudent to re-evaluate the chemical compatibility and dimensional accuracy of each printed vane. This can be done using standard alignment calibration fixtures and/or by making measurements using a viscous Newtonian calibration oil and comparing these measurements to reference standards.

The average value of the wall shear stress acting on the sample can be computed from the measured torque, which depends, at least in part, on the (unknown) constitutive model describing the test sample, and so there is unlikely to be a singular "best" vane design for best measurement of all materials. Viscous Newtonian fluids are more sensitive to internal structural details of the vane that can enhance or inhibit recirculation, whereas yield stress fluids are typically more sensitive to the number of outer contact edges N.

Three-dimensional printing allows for the rapid exploration and screening of the performance of a variety of geometric designs. For example, multipoint fractal designs such as the N=12, N=24 designs shown in FIG. 2 can provide excellent compromises balancing stress homogeneity, low occluded area fraction, and/or minimal slip artifacts. This can allow for identification of a bespoke design that fits specific needs, and for tuning of 3D-printed geometries to the specific rheology of the material of interest.

Figure 6:
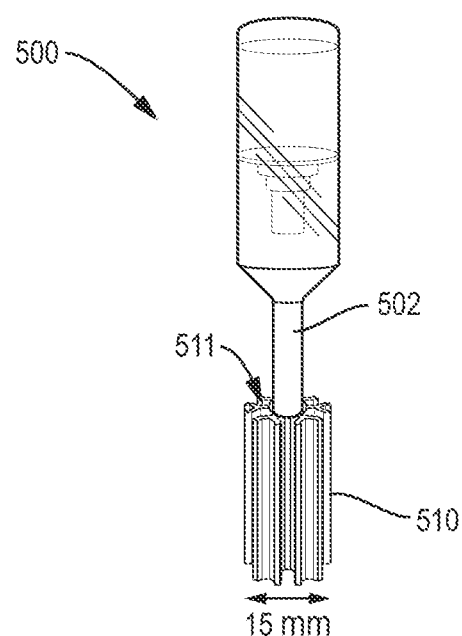
FIG. 6 is a schematic side view of an exemplary embodiment of a rheometer having a vane mounted on a spindle thereof.

The presently disclosed vanes can be configured to attach to a rheometer. FIG. 6 illustrates an exemplary embodiment of a rheometer 500 having a vane 510 coupled thereto. As shown, the rheometer 500 can include a spindle 502 onto which the vane mounts. The vane 510 can include a corresponding opening 511 therein to receive the spindle therethrough. The rheometer 500 can include a mounting design that allows direct connection of the spindle 502 to chosen vane geometry and a 45° transition angle and otherwise straight cylindrical features allows the vane to be printed via stereolithography without supports, building vertically from the vane end first, which is the upper surface in the 3D printer tray. Other configurations are possible, as are other mounting or connection techniques. For example, in some embodiments, the vane 510 can couple to the rheometer 500 using a coupling component (not shown) that is machined or otherwise manufactured, e.g., 3D printed, to interface between the vane 510 and the rheometer 500 to facilitate coupling. Coupling can occur via insertion of the coupling component into one or more of the vane and/or the rheometer or otherwise attaching to either of the vane or the rheometer to hold the vane in place.

In some embodiments, the overall dimensions and rheometer coupling of fractal vanes can be based on the commercial vane (N=4) available for the TA Instruments DHR series of rheometers with a diameter of $2R_v=15$ mm and a length of L=30 mm, though this coupling can be varied. The vane body was printed via stereolithography on a Form2 printer (Formlabs, Inc.) using Clear resin (Formlabs, Inc.), a methacrylate-based translucent photopolymer with Young's Modulus E=1.6 GPa, and ultimate tensile strength UTS=38 MPa (pre-curing). To facilitate attachment of the vane 510 directly to the draw rod of the rheometer, a threaded coupling can be included. A person skilled in the art will appreciate many of coupling techniques that can be used without departing from the spirit of the present disclosure. A slope on the mating joint between a spindle holding the vane and the coupling to the rheometer can allow the vane to be printed entirely without a supporting structure, increasing printing speed and quality, as well as obviating the need for support removal. To enable this, the vanes can be printed vertically, vane-end first. This orientation can ensure a good concentricity of the vane geometry with the printed rheometer coupling and a good surface texture as it avoids consecutive layers giving a "stair stepping" texture on the surface and negating any imprecision in the x-y and z-stage calibrations. The feature resolution is found to be approximately 200 μm over several cm, and vanes can be printed with the coarsest 100 μm layer height setting of the Form2 printer. Printing can take approximately three to about three-and-a-half hours per single build platform. The print time can scale sublinearly with the number of vanes printed in each tray due to the high speed of lateral in-plane motion that can be achieved in stereolithography, compared to the time used to recoat resin and incrementally move the build platform after each layer. For example, while one vane can be printed in about three hours, scalability can allow a dozen vanes to be printed in about seven hours.

In some embodiments, to robustly attach to a commercial rheometer, the printed vane geometry can be designed to accommodate a threaded insert (not shown) rather than by including printed threads integral to the vane. The coupling can be designed to be 3D-printed, fitted with an M4 threaded insert, and attached directly to a DHR3 or AR-G2 rheometer spindle (Discovery Hybrid Rheometer 3 or Advanced Rheometer-Generation 2; TA instruments, New Castle, Del.). The DHR and AR-G2 family of controlled stress rheometers can have a loose threaded "draw rod" extending through the drag cup motor housing and sensing head, with a spindle that aligns the geometry to the axis of rotation of the rheometer.

The 3D-printed part, which can have a loose interference fit (approximately 50 μm overlap) on the spindle for radial positioning, can lock in place axially using the spindle M4 screw with a threaded nut insert. These two generations of controlled-stress rheometers can also have a drag cup motor, radial air bearings, magnetic thrust bearings, and an optical encoder in the head of the rheometer. The stationary base can have a temperature sensor and Peltier plate assembly. A standard geometry can slide up onto the spindle and can be held axially in place by a long-threaded rod. In general, the presently disclosed embodiments contemplate modifications to the 3D printed or otherwise fabricated vane geometry to enable mounting to a rheometer, and/or improvement of its performance as governed by surface finish, runout of rotation, or other attributes. Such modifications may comprise polishing, machining, or other material removal processes, or assembly with other components to create an assembly comprising a vane tool.

Figure 7A:
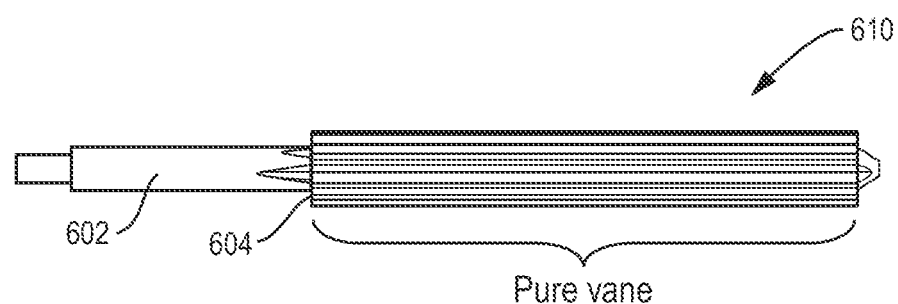
FIG. 7A is a perspective side view of another embodiment of a vane having a spindle passing therethrough, with the spindle having corresponding features to couple to the vane.
Figure 7B:
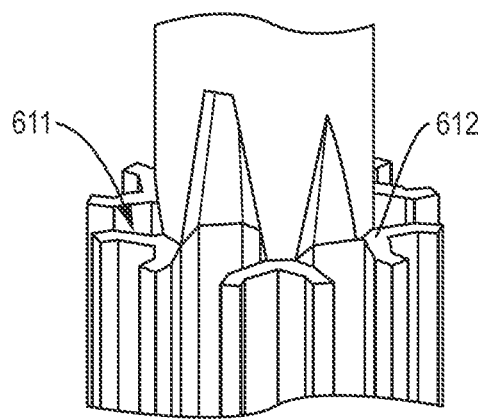
FIG. 7B is a magnified perspective view of the coupling of the spindle and the vane of FIG. 7A at a proximal end of the vane.
Figure 7C:
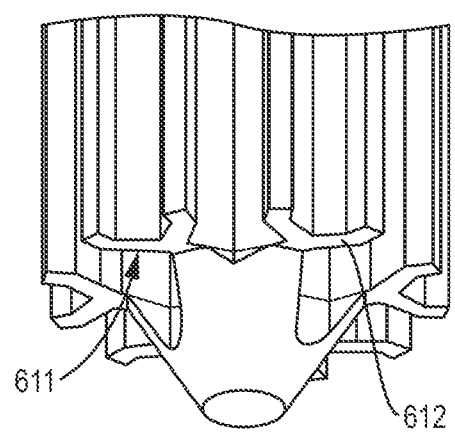
FIG. 7C is a magnified perspective view of the coupling of the spindle and the vane of FIG. 7A at a distal end of the vane.

FIGS. 7A-7C provide an alternate embodiment of a vane 610 that includes a central lumen 611 extending therethrough. The central lumen 611 can be configured to receive a central shaft 602 therethrough that can rotate the vane 610. As shown in FIGS. 7B-7C, the central shaft 602 can be configured to correspond to a shape of the vane 610 such that the vane 610 is received in corresponding grooves 604 of the central shaft 602, and vice versa, to couple the shaft 602 to the vane 610. A person skilled in the art will recognize that the shape of one or more of the vane 610 and/or the central shaft 602 can change based on a number of factors, including but not limited to a number of arms 612 in the vane to allow for the coupling to occur.

The vanes of the presently disclosed embodiments can be used in conjunction with a cup 520, which can contain a yield stress material to be measured. The cup 520 can be provided to improve convenience and versatility of the entire testing procedure. As shown in FIGS. 8A-8D, the cup 520 can complement the 3D printed vane 510 and serve as the sample holder. An inner surface 522 of the cup 520 can be textured with ribs 524 or similar features known to those skilled in the art to help prevent slip of the sheared sample at the outer wall, with, in some embodiments, square steps of approximately 1 mm width by approximately 1 mm depth, spaced apart by approximately 2 mm. These dimensions were chosen to give similar spacing as the arms of the 24-armed fractal vanes and to promote infill of the material into the gaps between the ribs 524 of the cup as shown in FIGS. 8A-8D. The inset of FIGS. 8B and 8D, which are magnified portions of FIGS. 8A and 8C, respectively, show that the crenelated ribs 524 around the outer surface can have approximately 1 mm width and side length, and approximately 2 mm spacing, though a person skilled in the art will recognize that these dimensions can vary.

In some embodiments, the cup 520 can be textured and 3D printed, and further, can be configured to attach to a standard rheometer base 528. For example, the cup 520 can include a base 526 that can be threaded, glued, or otherwise associated in a variety of ways with the cup 520 that will be recognized by a person having ordinary skill in the art. By way of non-limiting example, the base 526 can fasten onto the Peltier plate 528 that is a standard lower fixture on the DHR or AR-G2. The Peltier plate 528 can hold it, for instance, by an interference fit of six protruding arms or by using the arms as guides and using double-sided tape under the base for a more adjustable hold, among other techniques. A well-calibrated Peltier plate is generally orthogonal to the axis of the rotating spindle but is not necessarily concentric with it. The yielded area can be set entirely by the location of the vane perimeter and can extend radially outwards. Provided the yielded area does not reach the outer wall (i.e., provided the imposed wall shear stress is $\sigma_w/\sigma_y<(R_c/R_v)^2$, the cup shape and position only influences the spatial homogeneity of the linear viscoelastic deformation that occurs pre-yielding, with an effect proportional to the offset of the rotation axis. For measurements of yield stress fluids with a wide-gap geometry, precise concentricity of the cup may not be critical.

Figure 8E:
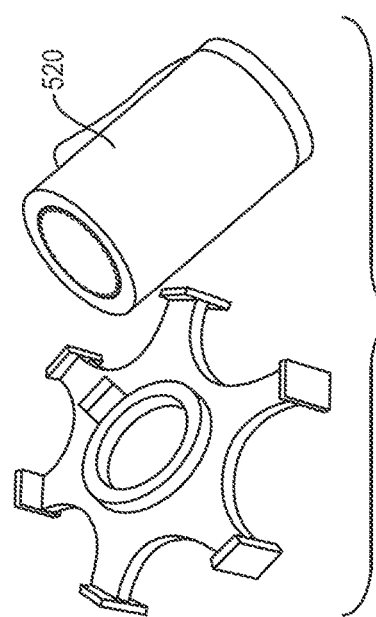
FIG. 8E is a perspective view of an exemplary embodiment of the cup being disassembled.
Figure 8F:
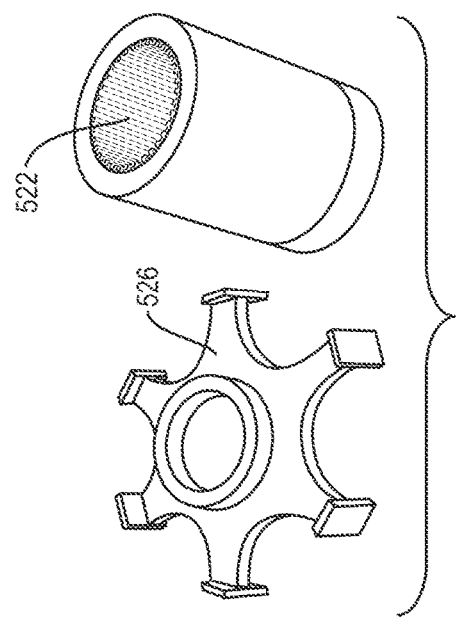
FIG. 8F is a perspective view of the disassembled cup and base.
Figure 8D:
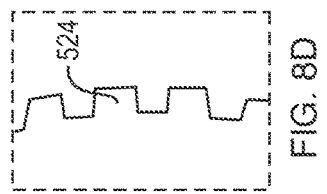
FIG. 8D is a magnified schematic top view of a portion of the system of FIG. 8A.
Figure 8C:
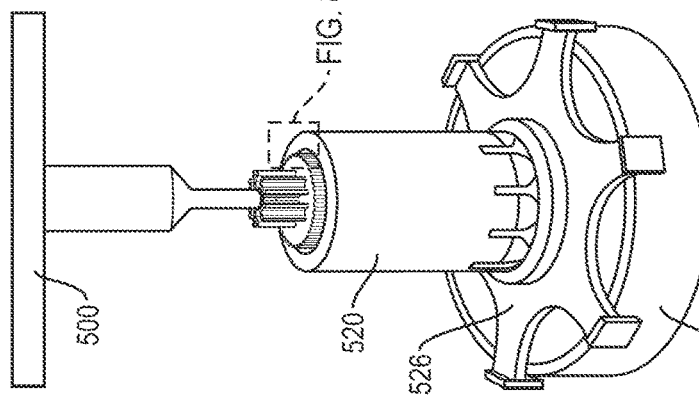
FIG. 8C is a further perspective view of the system of FIG. 8A.
Figure 8B:
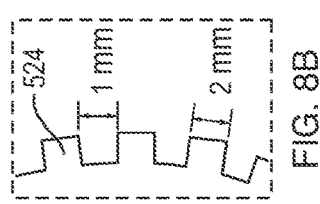
FIG. 8B is a magnified schematic top view of crenelated ribs of the cup of FIG. 8A.
Figure 8A:
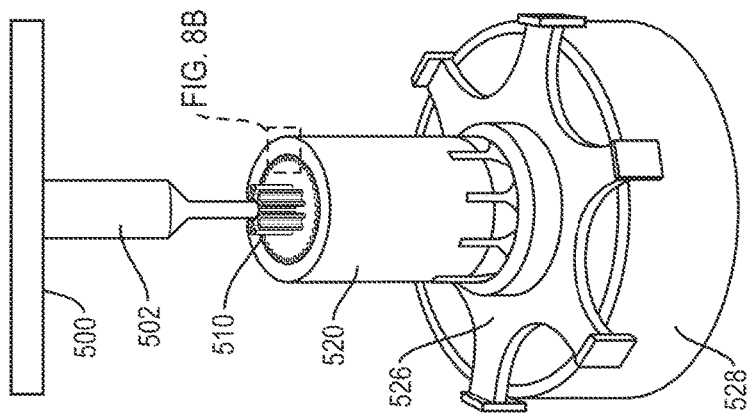
FIG. 8A is a schematic perspective view of an exemplary embodiment of a system having a cup clipped onto a base of a rheometer receiving a vane therein.

The cup 520 can be designed for facile use with yield-stress fluids. It is often challenging to fill a sample into the cup without bubbles and to clean out after use, especially given the crenelated walls. Viscous Newtonian fluids, which flow at every point inside the cup, are more sensitive to the internal structural details of the vane, which can enhance or inhibit local recirculations. A person skilled in the art will recognize that while the instant disclosure discusses use of yield stress fluids such as shampoo, conditioner, hair gel, lotions, toothpaste, condiments like ketchup and mayonnaise, and/or concrete, the presently disclosed cup 520 can hold a variety of solids or liquids therein. By contrast, the deformation in yield stress fluids is more sensitive to the number of outer contact edges, N, while the limited radial extent of the yield surface cloaks the geometric details of the inner structure of the vane from the flow field. As a result, the cup 520 can unscrew from the base 526, making it straightforward to access material in the cup for filling and cleaning, as shown in FIGS. 8E-8F. In such embodiments, the cup can be detachable as a cylinder without a bottom, making it easy to load and clean thicker or gelling samples. As an added benefit, this means that a single base can be used interchangeably with several 3D printed cups that differ in height and diameter, or that are pre-filled with different fluid samples, as long as they use the same (custom) 3D-printed mating thread. This enables multiple samples to be pre-filled and conditioned with a controlled waiting time and thermal history, if desired, then mounted directly onto the rheometer just prior to testing. Moreover, vanes and textured cups made by desktop stereolithography can be used to obtain rheological measurements that are consistent with "reference" measurements made by machined cone-and-plate geometries with carefully roughened surfaces to eliminate slip. A person skilled in the art would recognize that such a cup can include additional features, such as an embedded mirror or window to enable viewing of the inside of the cup during experiments. In some embodiments, the cup can include holes through which to exchange fluid or air to and/or from the cup rather than using the single top opening that is typically accessed during experiments.

EXAMPLES i. Carbopol

Carbopol was loaded into the textured cup and a constant rotation rate was imposed, approximately in the range of about $1.8\times10^{-4}$ to about $6\times10^{-1}$ rad/s, corresponding to shear rates approximately in the range of about $4\times10^{-3}$ to about 8 s$^{-1}$. The rotation rate was imposed for a set time that varied inversely with the rotation rate and increased sequentially in steps, with a 10 second waiting time between steps. In response to a single rotation rate, the stress initially grows linearly in time elastically followed by a plastic flow regime. When this transient stress response is plotted as a function of apparent strain, $\theta=\Omega t$, the curves superpose for all shear rates. The initial deformation is nearly linear in applied strain, allowing a shear modulus of G=810 Pa to be calculated from the average slope of the elastic response, $\Delta\sigma/\Delta\theta$, for all curves. At a critical apparent strain, $\theta_y \approx 0.2$, the material yields and undergoes plastic deformation, reaching a terminal stress that is nearly independent of shear rate over three decades of deformation rate. This is because the very low shear rates applied correspond to the stress plateau region shown in FIG. 7b so $\sigma_w \approx \sigma_y = 110$ Pa at long times for all these deformation rates. In response to increasing the imposed rotation rate $\Omega$, the terminal stress increases slowly and monotonically with rotation rate, but all curves reach the plastic flow regime with a terminal stress approximately within the range about $122 \leq \sigma^+(t \to \infty) \leq 182$ Pa.

ii. Mayonnaise

Mayonnaise (Hellmann's Squirtable) is a vinegar-and-egg-based emulsion of oil in water. Over time, the fat globules coalesce and particle flocs aggregate, yet imposed stress breaks up structures and/or induces particle migration and mild phase separation, thus resulting in a thixotropic yield stress response. This makes rheometry of such structured materials very difficult as they show sensitivity to their entire history, including the loading step required to place a sample into the rheometer. For this reason, the mayonnaise samples were held in the original off-the-shelf container for experiments. To investigate the thixotropy of the mayonnaise, a conditioning step was performed to reset the material history after the vane was inserted using a pre-shear rate $\dot{\gamma} = 0.1$ s$^{-1}$ for about 10 seconds, followed by a waiting time, $t_w$, varying from about 3 seconds to about 10,000 seconds. Lastly, a constant rotation rate of approximately $1.6 \times 10^{-4}$ rad/s for times $t > t_w$ was imposed. For all waiting times, the initial viscoelastic response is a power law with slope less than unity, indicating strain-dependent plastic losses. Subsequently, the material yields, showing a stress overshoot that depends strongly on the waiting time, $t_w$, before approaching a steady state terminal shear stress. This thixotropic overshoot is indicative of progressive structural buildup following the cessation of preshearing.

The initial power law characteristics of the transient stress growth are common in many microstructured food gels. One way of compactly modeling this response is by using a Scott Blair fractional element to quantify the rate-dependent material properties. This model has two parameters: a viscoelastic quasi-modulus G, and a fractional exponent $\alpha$ characterizing the order of the fractional derivative. For instance, $\alpha = 0$ indicates a purely elastic response, and $\alpha = 1$ indicates a purely viscous response. The stress-strain relationship for a Scott Blair element is defined as $$\sigma_{yx} = \mathbb{G} \frac{d^\alpha \gamma}{dt^\alpha} \quad (9)$$

with the fractional derivative dependent on the exponent $\alpha$. For start-up of steady shear after a waiting time $t_w$, where the apparent strain $\gamma \triangleq \theta = \Omega(t - t_w)$, results in $$\sigma_{yx} = \frac{\mathbb{G}}{\Gamma(1-\alpha)} (t - t_w)^{1-\alpha} \text{(for } \alpha \neq 0, 1) \quad (10)$$

where $\Gamma(\cdot)$ is the gamma function. This time-dependent relationship was fitted to transient stress growth curves for times $t_w \leq t \leq t_{lin}$ where $t_{lin}$ is the point at which the stress first reaches a value equal to its terminal value. The value of the quasi-property, or scale factor $\mathbb{G}$ in equations (9)-(10) increases from $\mathbb{G} = 600$ Pa·s$^\alpha$ at $t_w = 3$ s to $\mathbb{G} = 1080$ Pa·s$^\alpha$, beyond which it plateaus for $t_w \geq 100$ s. The fractional exponent similarly decreases from 0.46 to 0.14, beyond which it plateaus after 100 seconds, consistent with the increasingly solid-like nature of the material that occurs during restructuration. Similarly, the yield strain (at which $\sigma = \sigma_{peak}$) increases slightly for all measurements with increasing waiting time, from $\theta_y = 0.05$ rad to about $\theta_y = 0.09$ rad. After the initial viscoelastic buildup of stress, the mayonnaise exhibits a second thixotropic behavior with a stress overshoot, in which the stress increases to a maximum value $\sigma_{peak}$ before decreasing to a terminal asymptotic flow stress that is independent of sample age. The terminal stress was approximately in the range of about 65 Pa to about 70 Pa for all waiting times. The peak stress $\sigma_{peak}$ was constant at about 67 Pa for waiting time $t_{wait} < 100$ s and increased afterwards up to about 90 Pa. Based on analysis of the data, there can be distinct timescales for restructuring of the linear viscoelastic solid response and for the rise in the nonlinear overshoot stress in this material, which may both be called "thixotropic" timescales.

iii. Aqueous Battery Slurry

The yielding characteristics of an aqueous battery slurry comprised of Carbopol (Lubrizol, USA; 1 wt %), carbon black (acetylene black, Chevron, USA; 6 wt %), and 7 molar KOH (30 wt %) were measured; this mixture results in a paste with pH=12. The strong alkalinity increases electronic conductivity, improving performance as a battery material. It also causes this slurry material to corrode many metals, including commercial steel rheometer vanes. While the dispersed carbon black discolored our 3D printed resin, the vane did not show evidence of physical degradation even after 20 hours of experiments.

As with the other materials, a steady rotation rate was imposed (approximately $10^{-4}$ rad/s), without modification between trials. There was no conditioning pre-shear, because no combination of speeds and equilibration times were found to "reset" the material to give a repeatable initial stress response (i.e., the material ages irreversibly). The waiting time was therefore held to a constant value of $t_{wait} = 1000$ seconds between each test. The initial stress growth can be weakly sublinear in strain but remains almost constant with the number of times the sample is sheared. Fitting the data gives $\mathbb{G} = 430$ Pa·s$^\alpha$ and $\alpha = 0.17$. The yield strain, taken at the strain at which stress is a maximum, is $\theta_y \approx 0.1$ rad for the first step, and nearly constant thereafter at $\theta_y \approx 0.06$ rad.

This battery slurry also shows mildly thixotropic behavior with a weak stress overshoot. The stress overshoot remained constant at about 20 Pa, while the terminal yield stress decreased with each successive trial from about 40 Pa down to about 30 Pa, indicating irreversible material aging with repeated shearing. This effect may be due to shear-induced gravitational settling and flocculation, or shear-induced particle migration. Therefore, this slurry recipe would not be stable during use as an electrolyte in a flow battery. Yet, the ability to rapidly and reliably make such measurements using a fractal vane with absence of slip or sample loading artifacts makes the fractal vane useful for assessing development of a functional battery slurry recipe.

The illustrated and described systems, devices, methods, configurations, shapes, and sizes are in no way limiting. A person skilled in the art, in view of the present disclosures, will understand how to apply the teachings of one embodiment to other embodiments either explicitly or implicitly provided for in the present disclosures. Further, a person skilled in the art will appreciate further features and advantages of the present disclosure based on the above-described embodiments. Accordingly, the disclosure is not to be limited by what has been particularly shown and described, except as indicated by the appended claims. All publications and references cited herein, including the aforementioned document and provisional application, are expressly incorporated herein by reference in their entirety.

We claim:

1. A system for measuring fluid properties, comprising:
   a fixture having a branched structure, the branched structure having a central location and one or more central arms extending therefrom, the one or more central arms having at least one additional generation of arms branching from the one or more central arms such that a terminal end of the at least one additional generation of arms inscribe a circle or cylinder, the at least one additional generation of arms initiating from a location along the one or more central arms that is disposed radially away from the central location, and
   a rheometer to which the fixture is configured to couple.

2. The system of claim 1, wherein branches between the central location and outer surface enclose concave regions or cavities that contain a test material during tests.

3. The system of claim 1, wherein the branched structure is devoid of a cruciform shape extending from the central location.

4. The system of claim 1, further comprising a cup configured to have a sample material to be measured disposed therein, the fixture being configured to be received within the cup.

5. The system of claim 1, wherein at least one of the one or more central arms extends at an oblique angle with respect to at least an other one of the one or more central arms.

6. The system of claim 1, wherein the at least one additional generation of arms branch from the one or more central arms at an oblique angle relative to an other of the additional generation of arms.

7. The system of claim 1, wherein each of the at least one additional generation of arms has a plurality of contact points for interacting with one or more fluids being characterized, the plurality of contact points comprising a wetted perimeter of the fixture.

8. The system of claim 7, wherein the normalized displaced volume of the fixture is in the range of 0.03 to 0.23.

9. The system of claim 1, wherein a space between each central arm and each additional generation of arms is occlusion-free.

10. The system of claim 9, wherein an occluded area fraction of the fixture is in the range of 0.10 to 0.45.

11. The system of claim 1, wherein the at least one additional generation of arms further comprises at least one second additional generation of arms initiating from a location along the at least one additional generation of arms.

12. The system of claim 11, wherein the at least one additional generation of arms further comprises at least one more additional generation of arms initiating from a location along at least one previous generation of arms, with the at least one more additional generation of arms being separately disposed from the central location.

13. A rheometric fixture, comprising:
   a vane having at least one set of internal arms extending from a central location thereof, at least one arm of the at least one set of internal arms having one or more additional arms branching therefrom such that no portion of the one or more additional arms extends linearly from the central location, a terminal end of the at least one or more additional arms inscribing a circle or cylinder, and
   a rheometer coupling attached to a mating feature of a rheometer.

14. The fixture of claim 13, wherein a cross-sectional planform of the fixture emanating from the central location has a fractal-like geometry.

15. The fixture of claim 13, wherein concave cavities are present between each arm in the at least one set of internal arms and the one or more additional arms, the concave cavities having air or a sample fluid therein.

16. The fixture of claim 13, wherein an occluded area fraction of the fixture is in the range of 0.10 to 0.45.

17. The fixture of claim 13, wherein a ratio of a wetted perimeter of the fixture to an occluded area fraction of the fixture is in the range of 40 to 70.

18. The fixture of claim 13, wherein the at least one set of internal arms or the one or more additional arms are non-linear.

19. The fixture of claim 13, further comprising eight outer contact points to twenty-four outer contact points.

20. The fixture of claim 13, wherein at least one of the one or more additional arms branching from the at least one set of internal arms extends at an oblique angle relative to at least an other one of the one or more additional arms.

21. The fixture of claim 13, wherein the vane is nonplanar.

22. A method for using a rheometric fixture, comprising:
   placing a sample fluid in a cup;
   testing the sample fluid by contacting the sample fluid with a plurality of contact points of a vane, the plurality of contact points being disposed at distal terminal ends of arms that have proximal terminal ends emanating from another arm of the vane; and
   rotating the vane within the sample fluid to measure one or more of torque or rotation angle of the vane in the sample fluid.

23. The method of claim 22, wherein at least some of the arms on which the plurality of contact points are disposed do not extend directly from a central location of the vane.

* * * * *